US008484263B2

(12) United States Patent
Rosenberg (10) Patent No.: US 8,484,263 B2
(45) Date of Patent: Jul. 9, 2013

(54) METHOD FOR KEYLESS PROTECTION OF DATA USING A LOCAL ARRAY OF DISKS

(75) Inventor: Burton J. Rosenberg, Coral Gables, FL (US)

(73) Assignee: University of Miami, Miami, FL (US)

( * ) Notice: Subject to any disclaimer, the term of this patent is extended or adjusted under 35 U.S.C. 154(b) by 1169 days.

(21) Appl. No.: 12/394,184

(22) Filed: Feb. 27, 2009

(65) Prior Publication Data

US 2009/0161870 A1    Jun. 25, 2009

Related U.S. Application Data

(63) Continuation-in-part of application No. 11/839,909, filed on Aug. 16, 2007, now Pat. No. 8,156,168.

(60) Provisional application No. 60/838,220, filed on Aug. 17, 2006.

(51) Int. Cl.
    *G06F 7/00* (2006.01)
(52) U.S. Cl.
    USPC .......................................... 708/200; 708/250
(58) Field of Classification Search
    USPC .................... 708/200, 250; 713/153
    See application file for complete search history.

(56) References Cited

U.S. PATENT DOCUMENTS

| | | | | |
|---|---|---|---|---|
| 5,485,474 | A * | 1/1996 | Rabin | 714/762 |
| 7,391,865 | B2 * | 6/2008 | Orsini et al. | 380/201 |
| 7,827,398 | B2 * | 11/2010 | Liu et al. | 713/153 |
| 2002/0143710 | A1 * | 10/2002 | Liu | 705/75 |
| 2007/0174192 | A1 | 7/2007 | Gladwin et al. | |
| 2008/0137857 | A1 * | 6/2008 | Bellare et al. | 380/255 |

OTHER PUBLICATIONS

Ben-Or, Michael, et al.; "Completeness Theorems for Non-Cryptographic Fault-Tolerant Distributed Computation"; Association for Computing Machinery Symposium on Theory of Computing; 1998, pp. 1-10.
Cachin, Christian; "Research in security in Networked storage systems"; http://www.zurich.ibm.comt/~cca/research.html; Jun. 28, 2005.
Shamir, Adi; "How to Share a Secret"; Communications of the Association for Computer Machinery; Nov. 1979, vol. 22, pp. 612-613.
Trouessin, Gilles, et al.; "Improvement of data processing security by means of default security by means of fault tolerance"; Fourteenth National Computer Security Conference; 1991, pp. 295-304.
Bestavros, A., "An Adaptive Information Dispersal Algorithm for Time-Critical Reliable Communication", Network Management and Control, vol. II, Plenum Pub Co., 1994, pp. 423-438.

(Continued)

*Primary Examiner* — Chat Do
*Assistant Examiner* — Kevin G Hughes
(74) *Attorney, Agent, or Firm* — Christopher & Weisberg, P.A.

(57) ABSTRACT

A method secures data in a network. The data includes a data message that has a first bit length. A random number is generated and transformed to create a first pseudo random number. The first pseudo random number is mixed with the data message to create an encrypted message. The encrypted message is transformed into a second pseudo random number. The second pseudo random number is mixed with the random number to produce a key. The encrypted message is placed side-by-side with the key to produce an output message. The output message is dispersed into a plurality of fragments. The plurality of fragments is stored in a plurality of data storage devices.

16 Claims, 8 Drawing Sheets

OTHER PUBLICATIONS

Mironov, I., "Hash functions: Theory, attacks, and applications", Microsoft Research, Silicon Valley Campus, Nov. 14, 2005.

Storer, M.W., et al., "Potshards: Secure Long-Term Storage Without Encryption", 2007 USENIX Annual Technical Conference, pp. 143-156.

Blakley, G.R. et al, "Security of Ramp Schemes", in Proceedings of Crypto '84, Advances in Cryptology, LNCS 196, Springer-Verlag 1985, pp. 242-268.

Blundo, C., et al.. "Randomness in Distributed Protocols", in 21-st International Colloquium on Automata, Languages and Programming (ICALP '94) LNCS 820, Springer-Verlag 1994, pp. 568-579.

De Santis, A., "Multiple Ramp Schemes", Information Theory, IEEE Transactions on vol. 45, Issue 5, Jul. 1999, pp. 1720-1728.

\* cited by examiner

METHOD FOR KEYLESS PROTECTION OF DATA USING A LOCAL ARRAY OF DISKS

CROSS-REFERENCE TO RELATED APPLICATION

This application is a continuation-in-part-of U.S. patent application Ser. No. 11/839,909, filed Aug. 16, 2007, entitled METHOD AND SYSTEM FOR DATA SECURITY, which claims priority to U.S. Provisional Application Ser. No. 60/838,220, filed Aug. 17, 2006, entitled METHOD AND SYSTEM FOR DATA SECURITY, the entirety of both of which are incorporated herein by reference.

STATEMENT REGARDING FEDERALLY SPONSORED RESEARCH OR DEVELOPMENT n/a

FIELD OF THE INVENTION

The present invention relates to data security. More particularly, the invention relates to a method and system for providing for the confidentiality and availability of data, tolerant to inaccessibility or disclosure of some portion of the data, without the requirements for key secrecy.

BACKGROUND OF THE INVENTION

Storage of information in digital form often requires that the information be disclosed only to certain known entities, that the information not be modified except by known entities, and that those entities have assured access to the information. The confidentiality, integrity and accessibility of the information might be challenged by determined attackers who can take possession of some elements of the storage machinery, and who also might employ other strategies to compromise the mechanisms defending the confidentiality, integrity and accessibility of the data.

Encryption is the most common method to achieve data confidentiality. Such encryption mechanisms utilize a suitably chosen secret whose possession allows for access to the meaning of the data; without this secret, the data is meaningless. However, protection of the key is essential to preserve confidentiality as well as accessibility, since the disclosure or loss of the key entails the disclosure or loss of the data. Also, the data in encrypted form can be lost or unavailable, hence the data unavailable even when in possession of the secret.

Replication and information dispersion are common methods to achieve data availability. Replication stores the data on several devices or at several locations, so that loss of data on one device or at one location does not prevent access to the data. Dispersion is a more sophisticated method of replication, in which the data is manipulated so that, say, each of three locations can store one half the data in such a way that any two locations can reassemble from their respective halves the data. However, replication and dispersion do not provide confidentiality for the data, and in some ways make confidentially less likely as the data becomes available to more entities.

Various methods and systems use encryption and replication or dispersion to secure digital information. When both confidentiality and accessibility are required, a layered solution is used, such as encryption and replicating the encrypted data. Secret sharing is also possible, in which confidentiality is achieved by dispersing both data and noise (randomly chosen data) and there is no need for a key. However secret sharing requires a great deal of storage overhead and the heavy use of randomly chosen data.

No current methods or apparatus have been suggested or implemented that achieve both confidentiality and accessibility without the vulnerability introduced by the requirements of key management or without including a large burden for storage of random data for the purpose of hiding the actual data.

Therefore, a need exists for a method and system of protecting data such that the confidentiality and availability of data is provided while being tolerant to inaccessibility or disclosure of some portion of the data, without requiring key secrecy.

SUMMARY OF THE INVENTION

The present invention advantageously provides a method and data system for securing data in a network. Generally, data is secured in a two-stage process such that the first stage encrypts the data in an all-or-nothing manner and the second stage divides the encrypted message into fragments having replication properties and disperses the fragments into a plurality of storage devices.

In accordance with one aspect of the present invention, a method is provided for securing data in a network. The data includes a data message having a first bit length. A random number is generated and transformed to create a first pseudo random number. The first pseudo random number is mixed with the data message to create an encrypted message. The encrypted message is transformed into a second pseudo random number and mixed with the random number to produce a key. The encrypted message and the key are placed side-by-side to produce an output message. The output message is dispersed into a plurality of fragments. The plurality of fragments is stored in a plurality of data storage devices.

In accordance with another aspect of the present invention, a method is provided for securing data in a network. At least one random number is generated. The at least one random number has a first bit length. A data message is divided into a plurality of data segments. The plurality of data segments have a total amount of data segments equal to k. Each data segment has a bit length equal to the first bit length. The plurality of data segments and the at least one random number are dispersed into a plurality of fragments. Each fragment containing 1/k of the encrypted message such that any k fragments of the plurality of fragments can be used to recreate the encrypted message in its entirety. The plurality of fragments is stored in a plurality of data storage devices.

In accordance with yet another aspect of the present invention, a data security system includes a data encryptor and an information disperser. The data encryptor operates to generate a random number and transform the random number to create a first pseudo random number. The data encryptor further operates to mix the first pseudo random number with the data message to create an encrypted message and transform the encrypted message into a second pseudo random number. The data encryptor also mixes the second pseudo random number with the random number to produce a key and places the encrypted message side-by-side with the key to produce an output message. The information disperser is communicatively coupled to the data encryptor and operates to divide the encrypted message into a plurality of data segments.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein like designations refer to like elements, and wherein.

DETAILED DESCRIPTION OF THE INVENTION

A method, system and apparatus that provides for confidentiality, integrity and availability of data. The system and apparatus may be used, for example, for long-term data storage and archival, where keyless architecture is advantageous, and for nearline and on-line storage, where the resistance to penetration, compromise, and complicated corruption of trusted parties is also advantageous. The method and presence of the apparatus is transparent and may be integrated into existing architecture, such as, for example, a SysAdmin, Audit, Networking, and Security ("SANS") unit; a router in the software networking stack; or as part of a disk array unit.

Figure 1:
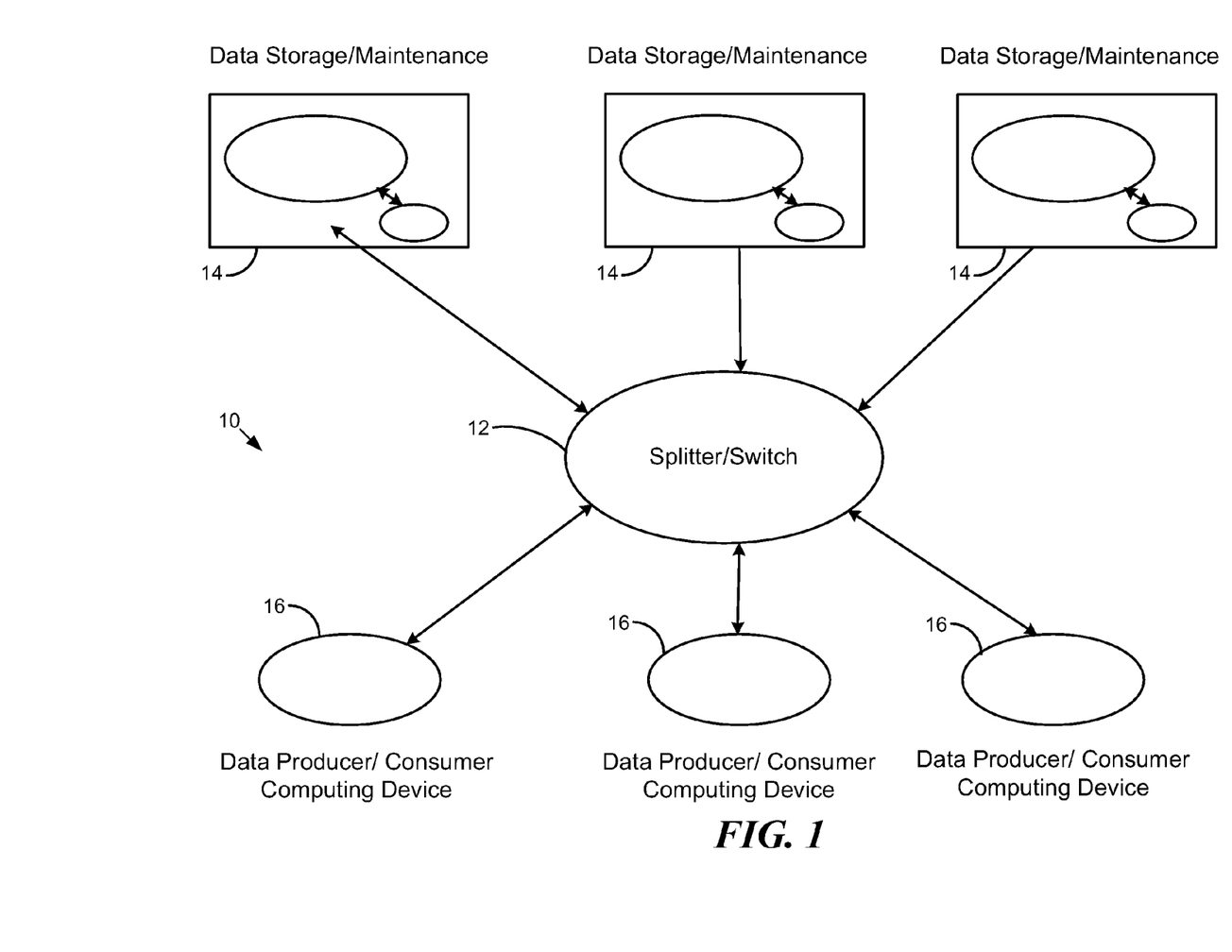
FIG. 1 is a block diagram of a data security system constructed in accordance in accordance with the principles of the present invention.

Referring now to the drawing figures in which like reference designators refer to like elements, there is shown in FIG. 1, a system constructed in accordance with the principles of the present invention and designated generally as "10." System 10 is a data security system and includes a data splitting and switching device 12 for dispersing and hiding data, interposing between network storage devices 14 (or other storage devices) and network client devices 16 (or other client devices). The data/splitter device 12 operates to modify, rout, hide, split, and reconstruct the data along communication channels and path between the storage devices 14 and the client devices 16.

The data splitter/switch device 12 prepares data for transfer form the client devices 16 to the storage devices 14 according to methods of data hiding, replication and dispersion, in accordance with the principles of the present invention. The data splitter/switch device 12 also retrieves the data from the storage devices 14 for return to the client devices 16 by inverse operations of collection, correlation among redundant shares, reconstruction and removal of randomness included for the purpose of hiding. The data splitter/switch device 12 can be configured according to the nature of the storage devices 14 and the client devices 16.

Figure 3:
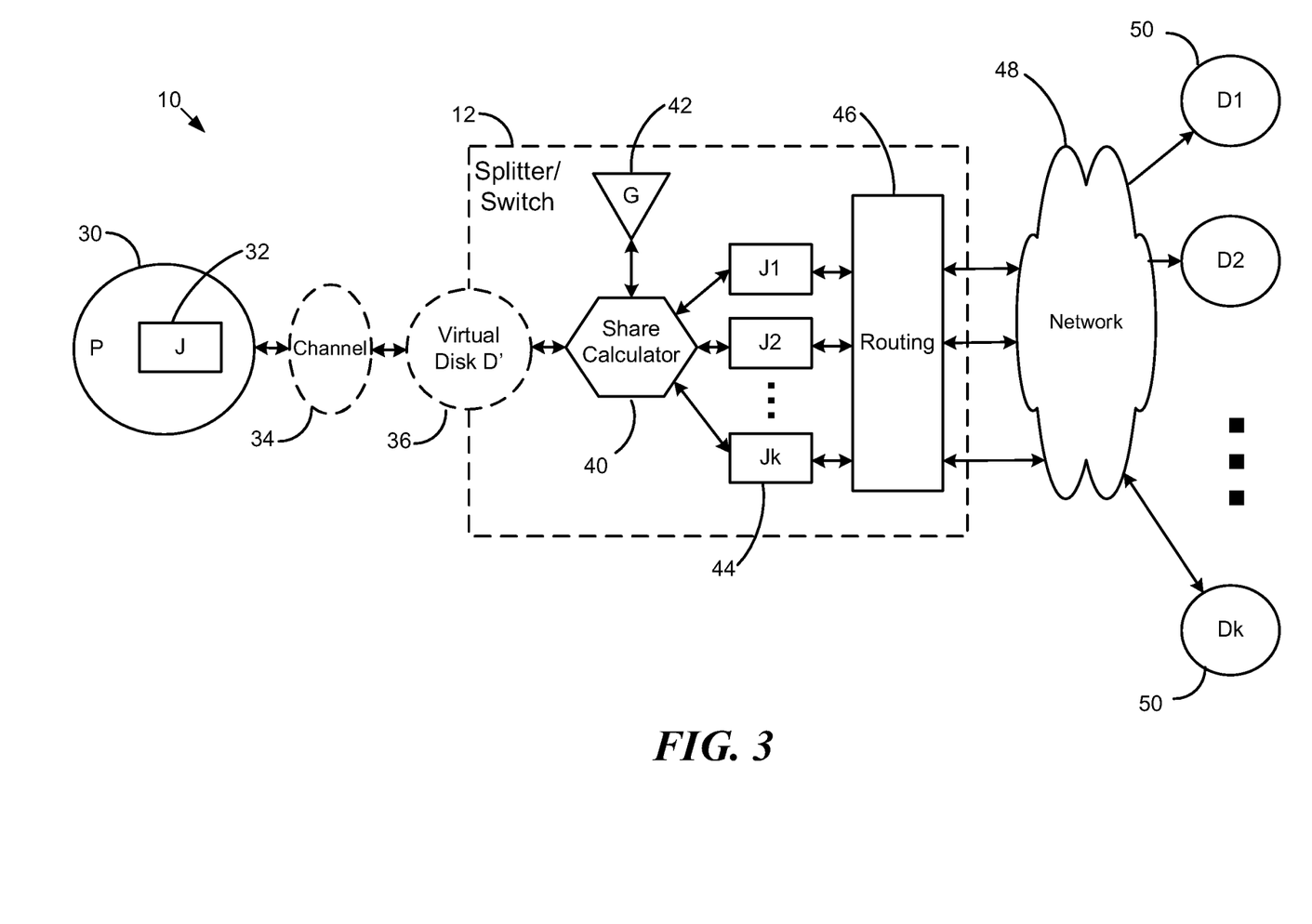
FIG. 3 is a block diagram of still another embodiment of the system of FIG. 1 constructed in accordance with the principles of the present invention.

For example, in one configuration, the storage devices 14 may be part of a SANS array. The data splitter/switch device 12 may be integrated into a SANS switch which works in conjunction with the storage devices 14. In such an embodiment, one advantageous aspect is keyless encryption of data by a method demonstrated by a data share calculator 40 (FIG. 3) and a routing component 46 (FIG. 3). The logical flow of data for this configuration is discussed below in greater detail with respect to FIG. 3.

In another configuration, the storage devices may be part of a data storage, maintenance and archival system. In such a configuration, the storage devices 14 may include, but are not limited to, one or more disks, disk arrays, RAID, network servers, or an equivalent.

Figure 2:
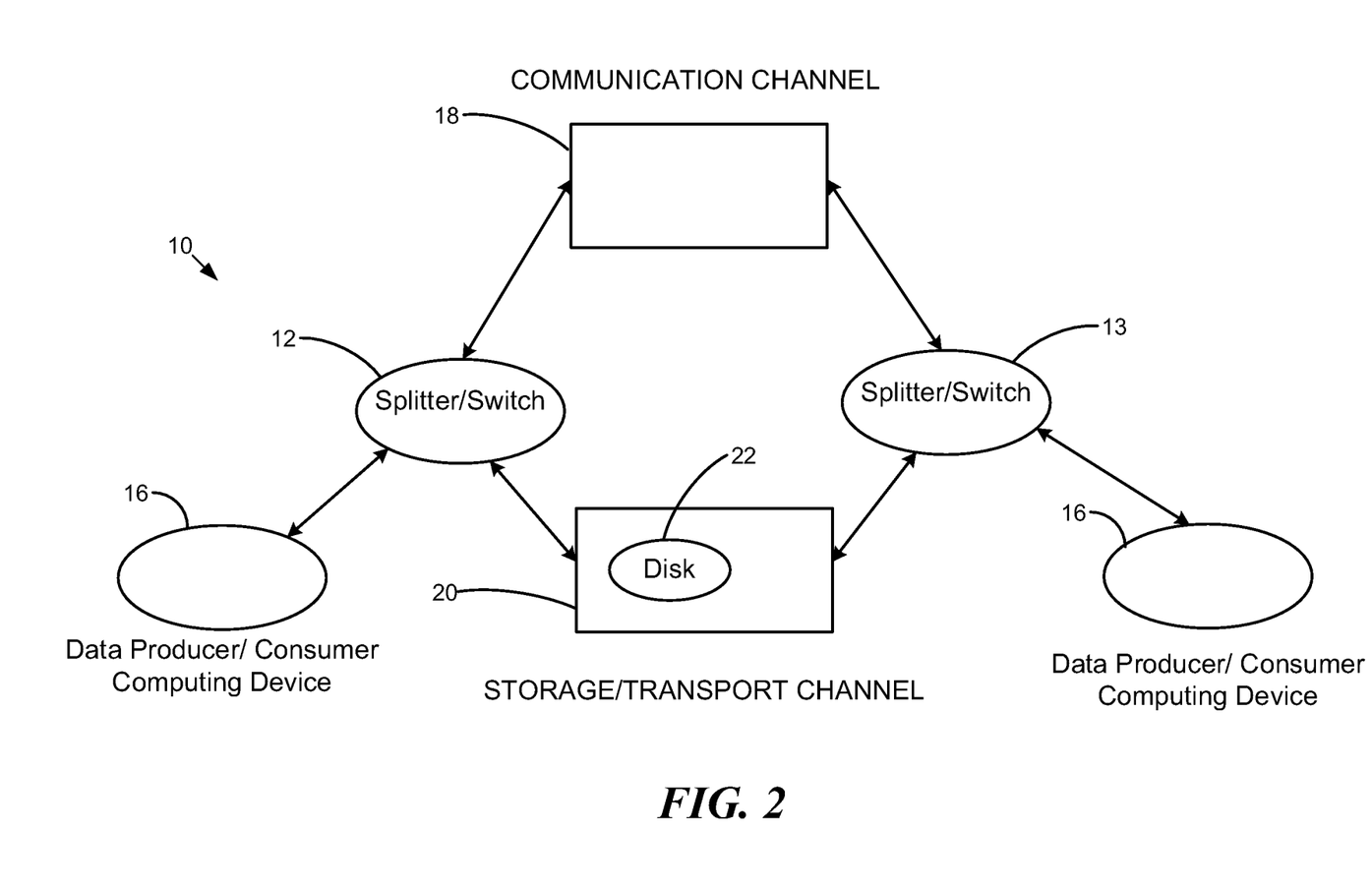
FIG. 2 is a block diagram of another embodiment of the system of FIG. 1 constructed in accordance with the principles of the present invention.

The client devices 16 are producers and consumers of data. In an embodiment, the client devices 16 are one or more personal computers ("PCs"), personal digital assistants ("PDAs"), hand-held computers, palm top computers, lap top computers, smart phones, game consoles or any other information processing devices. A personal computer can be one or more devices including a central processing unit, running any operating system for the exploitation of information, under any manner of trade names, including such trades names as Microsoft Windows, Linux, IBM, IBM Compatible, PC, Mac OS, OS X, Solaris, Sun OS, Ultrix, True 64, HPUX, AUX, AIX, RS/6000, IBM 360, BeOS, NEXT, IRIX, and so forth. FIG. 2 illustrates an exemplary data security system where the communication of data is secured by means of a diversity of data paths such as a storage transport channel 20 comprising a data storage unit 22 and a communication channel 18 of any of various technologies for the transportation by electro-mechanical, magnetic, optical phenomena. In an embodiment, the data splitter/switch device 12 performs the dispersal and hiding of data at the entry of channels 18 and 20. Data splitter/switch device 13 performs collection, correlation among redundant shares, reconstruction and removal of randomness, for presentation to client device 16. The upper channel 18 emphasizes the communication aspect of the channel. Data written into channel 18 may be transported before storage. The lower channel 20 emphasizes the storage aspect of the channel. Data written into the channel 20 may be stored before transportation. In one embodiment, data splitter/switch device 12 (the dispersion and hiding unit), writes into the network on the upper channel 18 and writes to a storage element 22, e.g., a disk of a computer notebook, on the lower channel 20. The storage element 22 eventually can be physically transported to data splitter/switch device 13 (the data collection, reconstruction and correlation device) and be joined with the data sent over the upper channel 18. The data splitter/switch device 13 can then complete the transport and present the data to client device 16. In this manner, the devices 12 and 13 provide for the transport and security of the data while the data is stored and/or transported.

Referring to FIG. 3, a logical flow of data through an embodiment of the data splitter/switch device 12 is illustrated. In this embodiment, a processor 30, e.g., a processor of a data producer/consumer computing devices 16, requests to read or write a data block J 32 into a virtual disk or device D' 36. In an embodiment, the channel 34 through which the block J 32 passes can be a hardware interface such as a local bus, for example, an AT Attachment ("ATA") or SCSI bus. In another embodiment, the channel 34 can be a hardware interface capable of switching and non-local delivery, such as Storage Area Network ("SAN") related technology. In another embodiment, the channel 34 can be a software channel, such as software device abstraction, e.g., /dev/hda or a software communication channel abstraction, e.g., a Berkeley Software Distribution ("BSD") socket or the like. The data splitter/switch device 12 is adaptable to interconnect with each of the above communication channels.

The splitter/switch device 12 includes a component to calculate data shares, either to split the data or to reconstruct the data, which may comprise a share calculator 40 and a random number generator 42, which may be a source of high quality random bits. The share calculator 40 is used to calculate any number k of splits, shares or portions of a data block or file. For example, in this embodiment, the data block 32 ("J") may be split into "k" number of splits, shares or portions 44, e.g., J1, J2 . . . Jk, for storage or transport. Similarly, when a client or data producer/consumer 16 having the proper authorization to access data block 32 ("J") requests data block J, the share calculator 40 can reconstruct the data block J from the splits, shares or portions 44, e.g., J1, J2, . . . , Jk.

The split calculator 40 is configured to provide any reconstruction threshold number "t" of data splits less than or equal to the total number "k" of data splits that are required to determine or reconstruct the original data. In other words, "t" is the number of data splits necessary to reconstruct the original data 32. For example, if threshold t equals 1, the method reduces to a standard redundant array of independent disks ("RAID") mirroring function, which is the copying of data to more than one disk and referred to as "RAID 1". In contrast, if threshold t is greater than 1, the method provides that the individual data splits, shares or portions 44, e.g., J1, J2, . . . , Jk are uncorrelated with the original data 32 and are therefore secure. In one embodiment, the encoding of the individual data splits, shares or portions 44, e.g., J1, J2, . . . , Jk can be performed by using an exclusive-or summer, or the Rabin method of encoding data in the constant coefficient of a higher order polynomial whose values at the sample points are the individual data splits, shares or portions 44.

When threshold t is 1 less than k, i.e., t=k−1, the method is similar to a standard RAID distributed parity, which requires all but one disk to be present to recover the original data 32 and is referred to as "RAID 5". However, the method of the present invention differs in that the data splits, shares or portions 44 individually, or in any collection of k−1 will be uncorrelated to the original data 32. Another advantage of the method of the present invention is that threshold t can take values other than k−1. In this way, the share calculator 40 provides secrecy by producing data splits, shares or portions 44 that are uncorrelated with the original data 32, if the data splits, shares or portions 44 are taken individually or in any combination where the data splits, shares or portions 44 is a number less than the reconstruction threshold t. For example, in one embodiment, the number of storage devices 50 is ten, e.g., D1, D2 . . . D10, and the reconstruction threshold is set at seven. In this example, when the number of retrieved data shares is greater than or equal to the reconstruction threshold of seven, the original data 32 can be properly reconstructed. Otherwise, the retrieved data shares cannot be reconstructed and the retrieved data shares will remain uncorrelated.

For example, the encoding of the individual data splits, shares or portions 44, e.g. J1, J2, . . . , Jk can be performed using a (k, n) threshold scheme. In this embodiment, a prime Q is selected such that the number of bits in its representation exceeds the number of bits in the data shares 44. Random values X1, X2, . . . , Xk are selected uniformly from 1 to Q−1, provided that they are distinct, and are assigned to the k data channels 50, e.g., D1, D2, . . . , Dk. The data shares 46 are retained and can be made public. In one embodiment, the Q and Xi are provided to the end data device Di 50, and can be queried and recalled from the data device 50. A random polynomial $f(x)=a_0+a_1 x+a_2 x^2+ \ldots +a_{t-1}x^{t-1}$ is selected by the share calculator 40. In one embodiment, the random polynomial is subject to the constraint that a0 is equal to the value of the data block 32 to be shared and the remaining coefficients ai are uniformly selected from the integer set 0 to Q−1. The share Ji is the value of the polynomial at Xi, e.g., Ji=f(Xi), where the polynomial arithmetic is calculated modulo Q. After the shares Ji are generated, the share calculator 40 can securely discard the random polynomial.

In an embodiment, a new random polynomial can be chosen by the share calculator 40 for each data block. The new random polynomial is generated securely in the share calculator 40. Reconstruction of the secret by the share calculator 40 commences with the reconstruction of the polynomial f(x). By using t shares from among the k shares J1, J2, . . . , Jk, it is possible to solve the t equations Ji=f(Xi) for the t unknowns a0, a1, . . . , a{t−1}. From the reconstructed polynomial f(x), the value of a0 is the original data 32 that was shared.

In other embodiments of share calculator 40, other methods of data sharing can be used. These other methods of data sharing are equivalent when known values are generated and assigned to data channels, random and unknown values are generated within the secure splitter/switch 12, the value of the data shares 44 are dependent on and calculated from both the known and unknown values, the random and unknown values generated with the secure splitter/switch 12 can be disposed, and the shared data 32 can be recovered by the presentation in sufficient quantity of data shares 44 along with the assigned known values.

The random number generator 42 generates a high quality of random bits for use by the share calculator 40 in its cryptographic or encoding process. Although random number generator 42 can be a pseudo random generator that is incorporated into software, a preferred embodiment utilizes a "true" random number generator that relies on the unpredictable quantum process of photon emission.

In an embodiment, the shares or portions 44 of the data block are routed by routing component 46 and encapsulated into the networking protocols so that each share or portion 44, e.g., J1, J2 . . . Jk, is delivered or retrieved via network 48 to/from data storage devices 50, e.g., D1, D2 . . . Dk. With each block of data to write, for example the data block 32, the splitter/switch device 12 may generate k−1 blocks or portions of random data J1, J2 . . . J(k−1). The last portion, Jk, may be chosen so that the "exclusive or" operator applied to all n portions will equal data block J.

In this embodiment, the routing component 46 advantageously routes the shares or portions 44 of the data block across networks having different protocols. For example, channel 34 can be an Ethernet network and network 48 can be an ATM network. The routing component 46 can "interwork" the Ethernet network 34 and the ATM network 48 to permit the data from one network to pass to the other and vice versa without the need for the data source to account for the protocol of the data destination. Upon receipt of an information frame from the source, e.g., channel 34, the routing component 46 forms a second frame of a format compatible with the destination network, e.g., network 48 and including the information payload, e.g., Ji splits, from the first frame. The routing component 46 also maps the destination address incorporated in the origin frame to a corresponding destination address of a format compatible with the destination network to facilitate forwarding of the second frame to the destination for storage or transport.

Of note, although the term "router" or "routing" is used herein to refer to the routing component used to transport data and/or route information within and between data producer/consumer computing devices 16 and data storage devices 50, it is readily understood by one of ordinary skill in the art that the present invention is not limited to such. Accordingly, the term "router" as used herein, can refer to any switching network element, such as a switch, router or any other computing device, such that the present invention is not limited to the use of routers in the traditional sense. Put another way, the term "router" is used merely for convenience herein and is not intended to limit the present invention to only traditional routing platforms.

Routing component 46 can include suitable hardware and software to enable it to perform the functions described herein with respect to the present invention. For example, routing component 46 can include a central processing unit, volatile and non-volatile memory and storage devices, network interfaces and processors as well as other I/O interfaces to enable configuration.

In an embodiment, the data storage devices 50 can be block read write devices, e.g., disk storage or redundant array of independent ("RAID") collections of disk storage. In another embodiment, the data storage devices 50 can be a communication channel write only at one end, read/write at the other, so that the data is written securely over a diversity of channels and is reconstructed for read and read/write at another end by a distinct computing facility. In another embodiment, the data storage devices 50 can be a communication channel which is modally write only and read only, such as a remote tape drive which is write only for backup and read only for recovery.

For data retrieval, the routing component 46 recovers the data splits, shares or portions 44 from the storage devices 50 and sends the recovered data splits, shares or portions 44 to the share calculator 40 for reconstruction of the original data 32. Reconstruction of the original data 32 can proceed if at least the threshold t number of data splits, shares or portions 44 is recovered. Otherwise, the data splits, shares or portions 44 will remain uncorrelated and reconstruction of the original data 32 will fail.

Another embodiment enhances the data security by extending secret shares for use in a RAID array. Random values are mixed in with the message in order to create an all-or-nothing information revealing situation, also known as a threshold. The values are dispersed with replication in a symmetric manner so that any k of n pieces can reconstruct the message, where k and n are integers and k is less than or equal to n. The all-or-nothing pieces are placed side by side and the collected message is cut up into the input of a single dispersal step. The use of randomness in the all-or-nothing stage is balanced against the information division of the second stage. This two step process yields definitive security properties.

In the all-or-nothing stage, there can be a k of n split, where any less than k pieces give no information when put together, but k or more pieces can exactly reconstruct the message. The information is distributed to the n pieces such that reconstruction of the original message is all, i.e., the message is exactly reconstructed, or nothing, i.e., nothing about the message is yet learned. The boundary between all and nothing is exactly at the collection of any k of the n pieces to which the message is split.

In information dispersal, the message is divided into n pieces, such that any k will reconstruct the message; however, each of the n pieces gives 1/k of the information of the message. As more pieces are collected more information of the messages is collected, until k pieces are collected and the message can be reconstructed. However this method is not all-or-nothing because as pieces are collected the message becomes known gradually.

The problem with a strictly all-or-nothing approach is that an amount of random noise containing information content equivalent to the message must be added to the message. In other words, the size of the message is doubled. Thus, at least 2 Megabytes of space is needed to hide a 1 Megabyte file. Generation of truly random bits is an expensive process as true random numbers cannot be produced without relying upon measurement of some physical phenomenon, such as radioactive decay, thermal noise, or shot noise.

For a pure 2 of 3 dispersal, a 1 Megabyte file would have ½ a Megabyte in each of 3 files, so that any two fragments can reconstruct the file. The total space is 1½ Megabytes, thus much less storage is required and no randomness, but there is not much information being hidden.

An embodiment of the present invention combines the all-or-nothing approach with an information dispersal process, resulting in a two stage process such that for a message cut into n pieces, any k pieces will reconstruct the message. Therefore, each piece will have 1/k of the information. In other words, if the message size is m bits, r bits of noise are added so that the total message size of a fragment, $(m+r)/k$, equals the amount of noise r bits, i.e., $r=m/(k-1)$. Thus, for a 2 of 3 dispersal constructed in accordance with the principles of the present invention, a message of 1 Megabyte is broken into three 1 Megabyte pieces, for a total required space of 3 Megabytes. When the message is reconstructed, so is the randomness, which is subsequently discarded. The randomness is included solely for the purpose of all or nothing type encoding.

Figure 4:
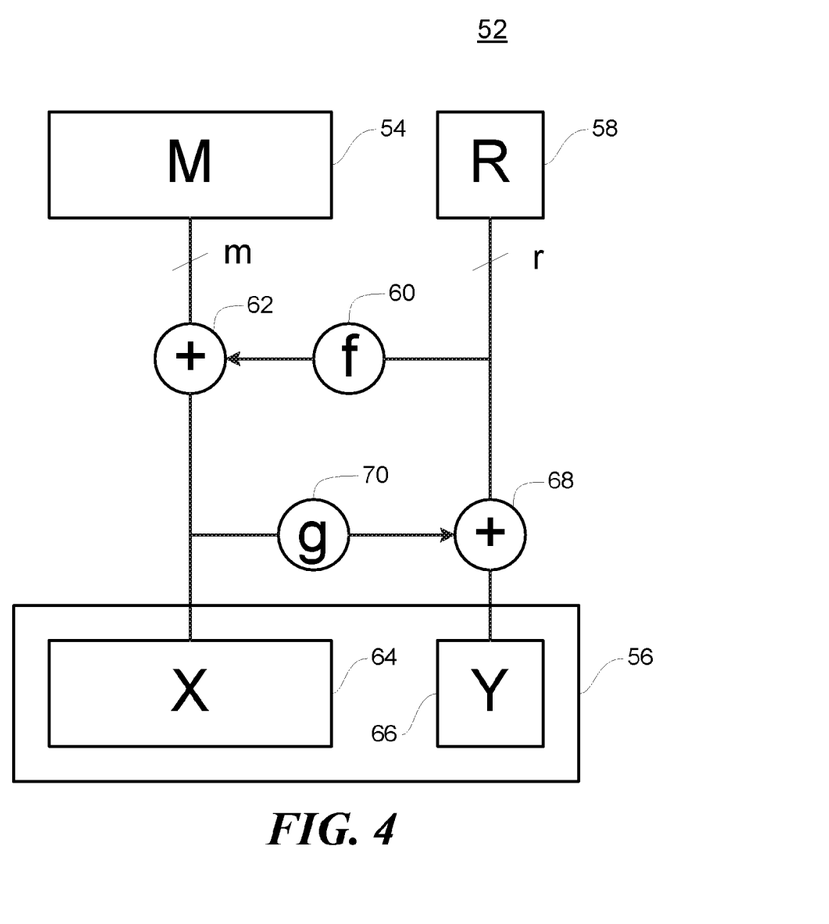
FIG. 4 is a flow diagram of a data encoding method according to the principles of the present invention.

Referring now to FIG. 4, an exemplary first stage process 52 for transforming a message 54, denoted as M, into an encrypted output 56 is shown. M is m bits in length. For each message M, a randomness factor 58 comprising a random string of r bits, denoted as R, is added to M prior to sending or storing. The values r and m are integers, wherein r is less than or equal to m. A transformation function 60, denoted as $f$, expands the r bit integers to m bit integers in a cryptographic manner. The function $f$ is a "pseudo random number generator." The number $f(R)$ is m bits in length, i.e., the same length as M. M and $f(R)$ are combined through a bit-wise exclusive OR 62 to yield an encrypted message 64, denoted as X, i.e., $X=M+f(R)$.

Because R is required to recalculate M from X, R is output disguised in the form of a key 66, denoted as Y, i.e., $Y=R+g(X)$, where Y is the sum of the bitwise exclusive OR 68 of R and $g(X)$, and g is a function 70 that converts from m bit integers to r bit integers.

It should be noted that the functions $f$ and g are cryptographically strong functions in that the input to the function cannot be readily determined merely by knowing the output value. These functions are known as cryptographic hash functions. The function g may be, for example, an ad-hoc such function as that defined as the Secure Hash Algorithm-1 ("SHA-1"), defined under the Federal Information Processing Standards. The number of bits required may be less that the SHA-1 output, i.e., less than 160 bits, by only taking some of the bits, such as the lowest order bits, or as many bits as necessary to make r bits.

The resulting output 60 is simply X and Y, represented side-by-side as a number having a bit-length of (m+r), precisely:

$$(M+f(R))|(R+g(M+f(R))). \tag{1}$$

Figure 5:
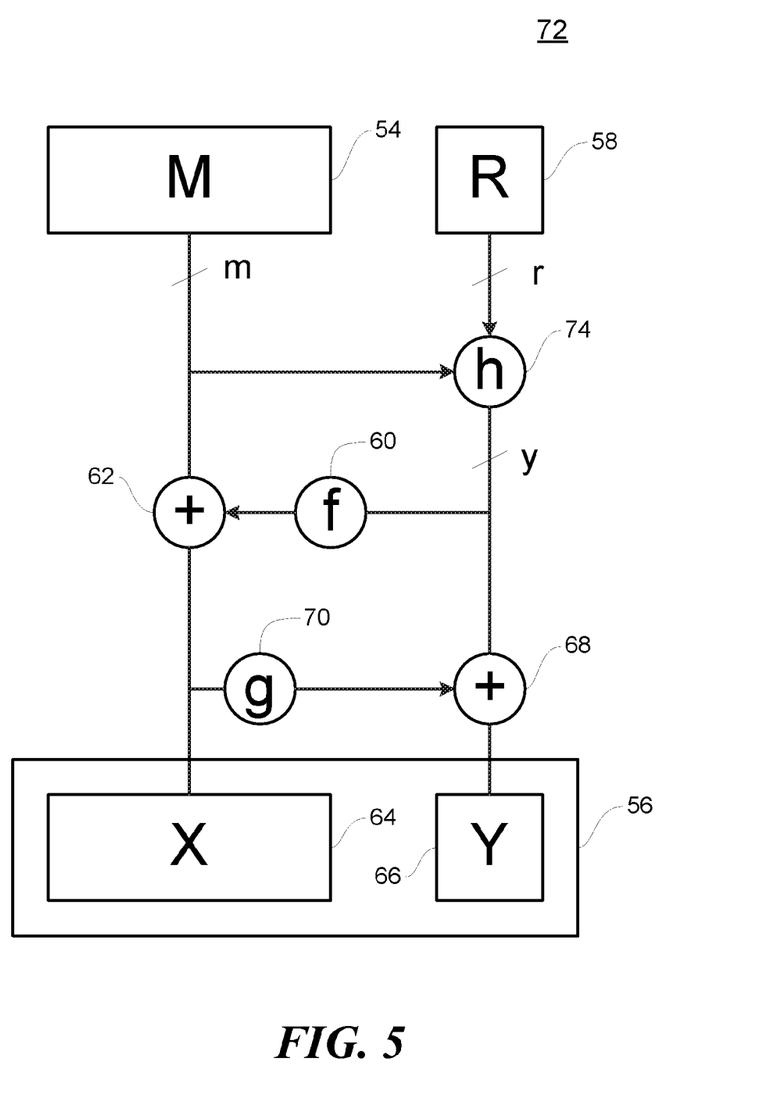
FIG. 5 is a flow diagram of an alternative data encoding method according to the principles of the present invention.

Referring now to FIG. 5, an exemplary first stage encryptor 72 is shown for cases where the number of random bits r is very small. In this instance, it is useful to add strength in an ad-hoc manner by adding non-random bits before using the function $f$. FIG. 5 resembles FIG. 4 in that a message 54, denoted as M and containing m bits, and a random number 58, denoted as R and containing r bits chosen randomly for each message M, are to be sent or stored. The outputs 64 and 66, denoted as X and Y respectively, hide M by the output of pseudo-random number generator 60, denoted as $f$, which converts y bits to m bits, where y is an integer less than or equal to m, and r is an integer less than or equal to y.

FIG. 5 uses a cryptographic hash function 74, denoted as h, which takes an integer of (m+r) bits, or equivalently, two integers, one of m bits and the other of r bits, and delivers a cryptography hash of the number (or numbers) of y bits. That value masks M and is the output X, as shown in the equation:

$$X=M+(f(h(M,R))), \quad (2)$$

where "+" is the bitwise exclusive OR 62, and $f$ is a pseudo-random number generator 60 which expands a y bit number to an m bit number in a manner which is cryptographically strong. Examples of such functions are iterated Triple Data Encryption Standard ("Triple DES" or "3DES") in Output Feedback Mode, or Blum Blum Shub ("B.B.S.") pseudorandom number generation.

Continuing on with FIG. 5, the value h(M,R) is combined with g(X) through exclusive OR 68, where g is a cryptographic hash function taking in m bits and producing y bits. The output is given as:

$$Y=g(X)+h(M,R)=g(M+f(h(M,R)))+h(M,R). \quad (3)$$

Figure 6:
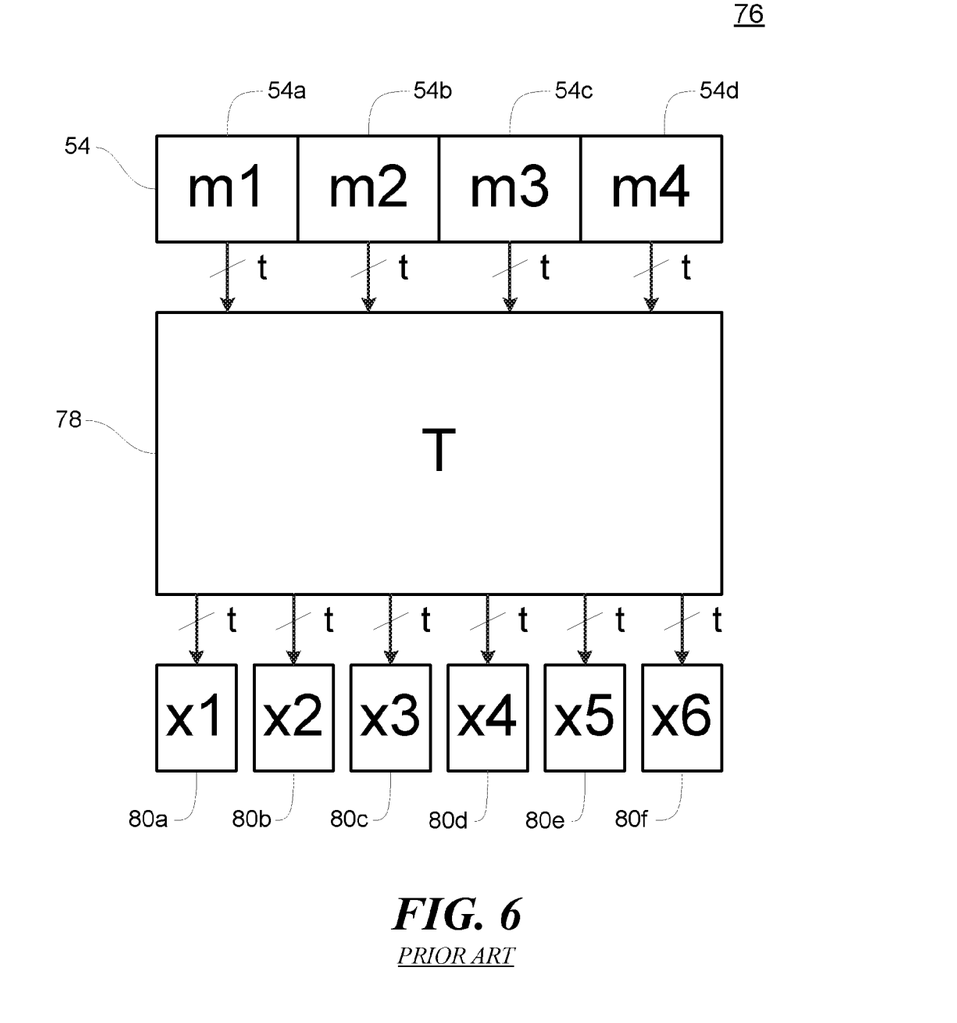
FIG. 6 is a flow diagram of a data splitting and distribution method according to the principles of the present invention.

FIG. 6 illustrates a generalized view of an information disperser 76. A message 54, denoted as M, is divided in a simple manner into several pieces. FIG. 6 shows how a 4t bit message is divided into the first t bits, the second t bits and the so forth, into 4 messages 54a, 54b, 54c, 54d, denoted m1, m2, m3, m4, each section having t bits. A data transformation function 78, denoted as T, disperses the information into 6 fragments 80a, 80b, 80c, 80d, 80e, 80f, (referred to collectively as fragment 80 and denoted as x1, x2, . . . , x6), each fragment 80 also containing t bits. The transformation T is such that any four of the six fragments 80 will combine to reconstruct the message M=m1|m2|m3|m4, where the bar symbol means to place the t bits of m1 next to the t bits of m2, etc., and read the 4t bit entirety as a single message M.

Simple information dispersal such as the example shown in FIG. 6 is known in the art. For instance, letting each of m1, m2, m3, m4 be mapped to numbers, the polynomial T(x)= m1+m2x+m3x$^2$+m4x$^3$ is formed. T(x) is evaluated at six values of x, for example, x'1, x'2, . . . x'6, and the evaluations are the outputs x1, x2, . . . , x6. In other words, x1=T(x'1), x2 T(x'2), and so forth. Any four samples among the x1, . . . x6 is sufficient to reconstruct the polynomial, but theorems of mathematics state that any third degree polynomial is fixed by its value at four distinct points.

As another example, T may be a matrix of dimensions 6 by 4, such that any 4 by 4 sub-matrix is invertible. There are standard constructions to create such a matrix, such the Vandermonde construction, which depends on the fact that the curve described by taking x to the 6 dimensional vector, (1, x, x$^2$, x$^3$, x$^4$, x$^5$), intersects a 5 dimensional flat exactly five times. Hence, samples of this curve give an unlimited supply of 6-vectors which are linearly independent. Other constructions, including picking vectors at random, are also likely to be linearly independent.

The encoding creates a vector of the four inputs, (m1, m2, m3, m4) and multiplies by the matrix T to produce a 6-vector result, which is read off as (x1, x2, . . . , x6). Given any four of the six x samples, the sub-matrix of T of corresponding rows is extracted from T, denoted as $T_1$, and the matrix inverse $T_1^{-1}$ is computed. The m vector is recovered by multiplying by the vector of x's.

It should be noted that each of the outputs x1, . . . , x6 may represent a separate storage location or transmission channel.

It is also noted that the use of six such blocks is for the purpose of illustration, and other numbers of blocks can be used without modifying the nature or qualities of the invention. Because of the premixing of noise as in FIG. 4 and FIG. 5, any r bits among the 6t bits can be revealed without revealing any information concerning the m bits of message.

While various methods of hiding and dispersion are known in the art, there is not presently a method by which the two methods are combined in the manner of the referenced diagrams to provide resistance to partial disclosure, as described above. This method advantageously resists loss of data blocks, since only 4 of the 6 data blocks need to be collected for reconstruction of the message. Also, the method resists an opponent's corruption of the data for the purposes of interfering with faithful reconstruction of the data, since it is possible to omit the use of a corrupted block in the reconstruction of the data.

It is possible to resist the use of a corrupted block in the reconstructed data by employing known techniques in novel ways. For example, as the message includes an integrity check, any reconstruction of the data that does not satisfy the integrity check may be assumed that one among the data blocks used in the reconstruction has been corrupted. By a systematic or random substitution of data blocks used in the reconstruction, a faithful reconstruction can be accomplished provided that no more than a minority of adjustable size of blocks have been corrupted.

In the diagram of FIG. 6, the output bit blocks are x1, x2, . . . , x6. However, it should be noted that six has been chosen as the number of fragments shown in this example only for the convenience of illustration. Any integer n equal to or greater than integer k is possible, wherein k is any integer that can evenly divide up the blinded message block X|Y of (m+r) bits.

Figure 7:
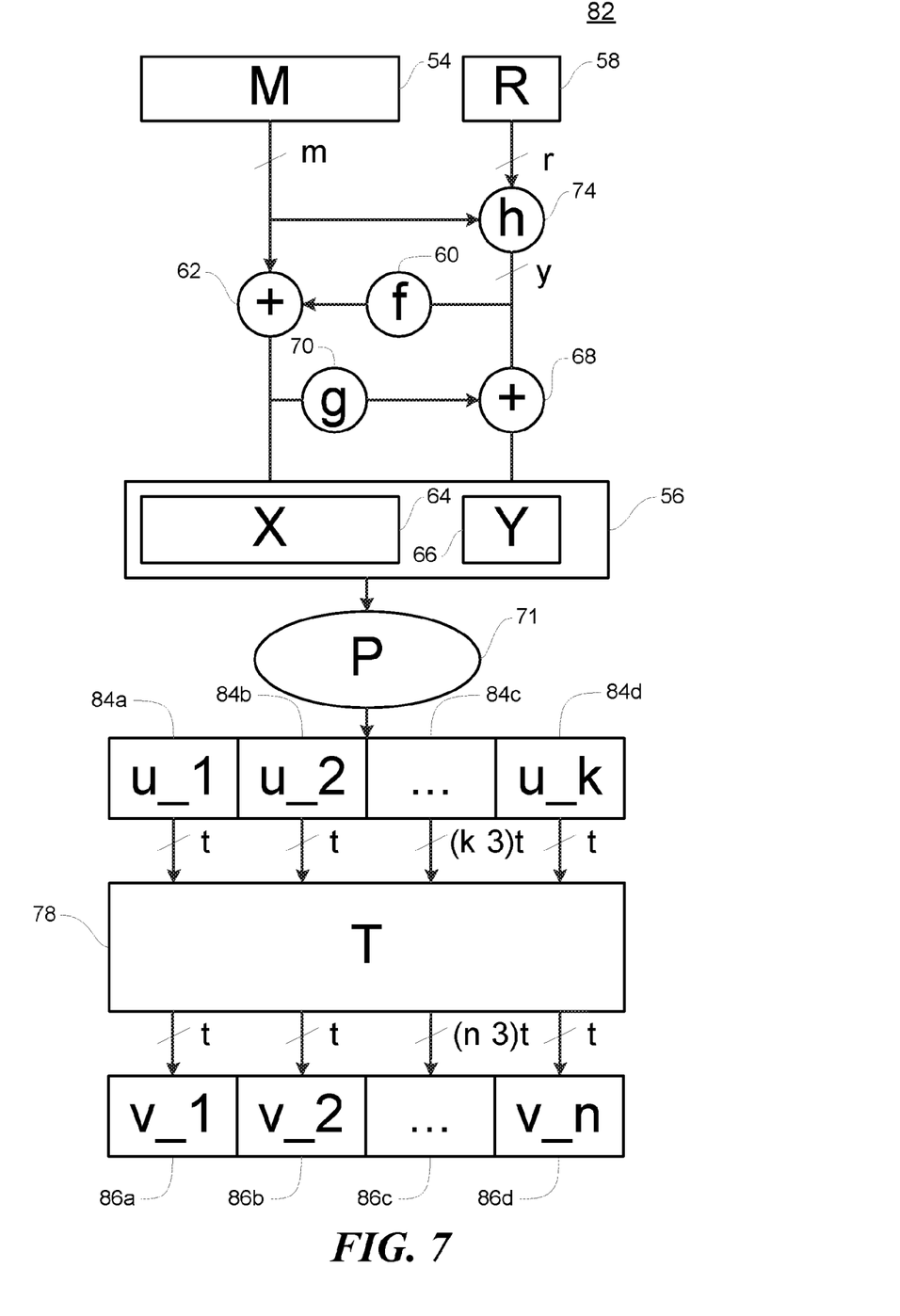
FIG. 7 is a flow diagram of an data splitting and distribution method including a randomness factor according to the principles of the present invention.

FIG. 7 is a diagram which shows how the circuits of the all-or-nothing stage 52 and of the information dispersal stage 72 are combined to provide a process 82 for securing data. The all-or-nothing stage 52 adds noise to the message M and to output the message and the noise in such a manner that the entire block is reconstructed before M can be extracted. However, this proposition is not entirely true since it is possible to guess the r bits of noise. In other words, the message M cannot be known without knowing the entire output 56, but can be known up to the $2^r$ possible values of R.

Block P 71 is a method to rearrange the bits between the output 56 of the all or nothing stage 52 and the information dispersal process 72. Such a rearrangement is provided for the convenience of implementation, and may or may not be present in an embodiment. The output 56 of the circuit of the all-or-nothing stage 52 is fed into the second stage information dispersal process 72, where the information dispersal process 72 divides the bit block of X|Y into k bit blocks 84a, 84b, 84c, 84d (referred to collectively as bit block 84 and denoted as u_1, u_2, . . . , u_k), and disperses the bit blocks 84 into n fragments 86a, 86b, 86c, 86d (referred to collectively as fragments 86 and denoted as v_1, v_2, . . . , v_n).

Suppose k=3 and n=4 in the dispersal stage and r=m/2. Only half of the number of bits of noise are added than in the traditional splitting. The example is a 3 of 4 reconstruction, so three fragments give 100% of the information, the message and the noise. However, one fragment gives none of the information and two fragments only yield give 50% of the information. Thus, knowledge or interception of a single fragment is practically useless in deciphering the input. The total storage needed is (m+r)(n/k)=(3/2m)(4/3)=2m. This storage requirement is midway between the storage of the two pure schemes, with security properties which are midway.

Figure 8:
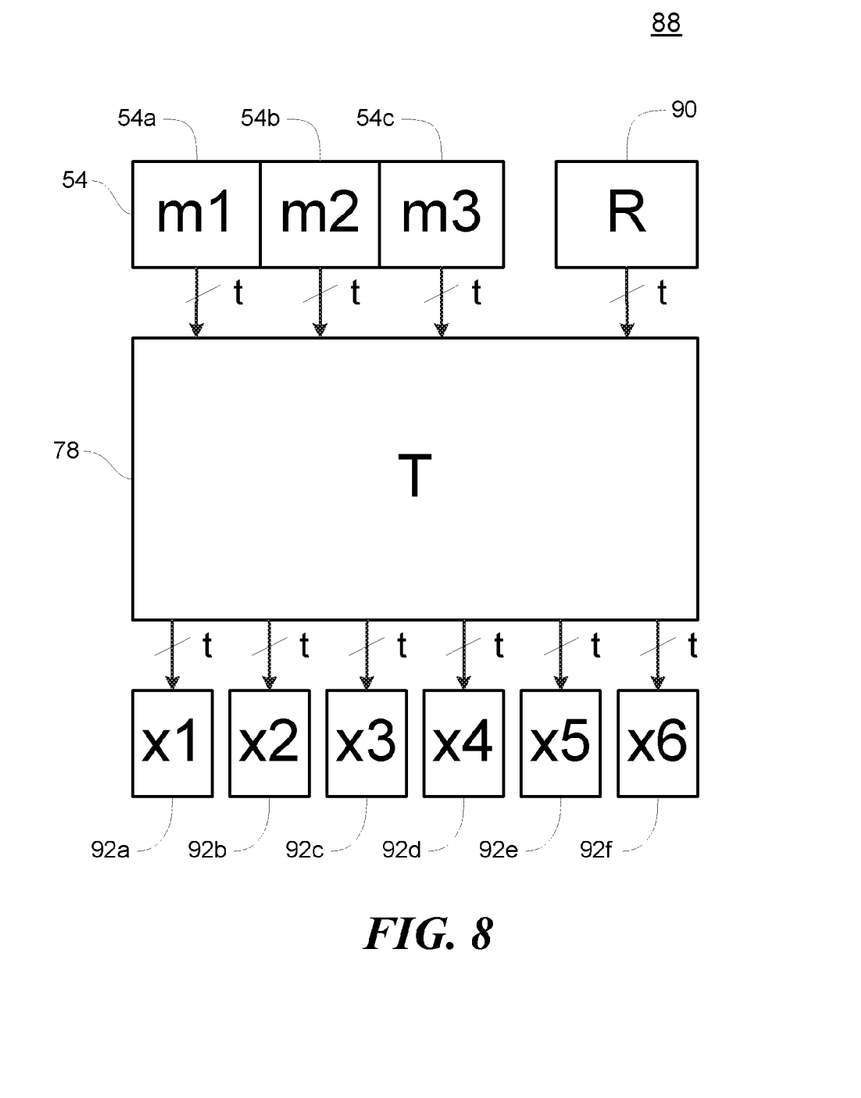
FIG. 8 is a flow diagram of a data encoding method used in conjunction with a data splitting and distribution method according to the principles of the present invention.

FIG. 8 provides an alternative method 88 for combining the random number 58, denoted as R, with the message 54, denoted as M. This embodiment directly feeds these values into the dispersal function 78, denoted as T. In this embodiment, the function T takes k inputs 54a, 54b, 54c, of which k−1 are segments of the message M divided into k−1 pieces, wherein each piece contains consecutive bits of M. The last of the k pieces 90 is a random number generated for each message M sent or stored. The randomness and the message are equally dispersed over the output fragments 92a, 92b, 92c, 92d, 92e, 92f (referred to collectively as fragments 92 and denoted as x1 through xn). The amount of randomness is adjusted according to the above formula so that it equals or exceeds the number of bits in a single fragment, i.e., (m+r)/k bits=r bits.

For a 128 bit message that may be reconstructed from 9 pieces, r=16. Thus, the input is 144 bits, and each input and output fragment of the dispersal mechanism T is 16 bits. If the redundancy is such that any n=20, so that four pieces can be erased or lost and the data can still be reconstructed, the total bit cost to store 128 bits message is 320 bits, i.e., a 2.5× message expansion. Any exposed fragment provides 16 bits of information, but the randomness added is 16 bits. Thus, it is mathematically possible that the information provided is just the randomness added, and nothing about the data to be stored.

Other equations may be written so that more than one fragment can be exposed, and the information content of what is exposed equals the randomness added. In other words, the present invention is scalable such that as the amount of randomness, i.e., length r of R, is increased, the amount of fragments needed before anything may be learned about the content of the message M is increased. In the extreme, the present invention provides pure secret sharing, with r=m and all or nothing disclosure. At the other extreme, with r=0, the present invention is pure dispersal.

The present invention advantageously provides and defines a comprehensive system and method for data security against unauthorized users. The present invention further advantageously provides a data security device that operates in a transparent fashion to one or more client devices and one or more storage systems of one or more networks.

Prior methods have used information dispersal in the context of reliable storage. Such methods suffer from partial loss of confidentiality if the blocks, which are not encrypted, are compromised, that is, their contents becoming known to the adversary. A method of hiding provided in advance of dispersal to alleviate this shortcoming is not found in the art. While prior methods may reveal the use of data hiding by itself, those methods result in an enormous storage cost. Such methods rely in fact on multiple redundancies, and to protect from a compromise of, for example, k services, data size must be multiplied by k+2. Other methods provide hiding after dispersal; however the mathematics of such an arrangement is far inferior to the system and method taught in this invention.

The present invention can be realized in hardware, software, or a combination of hardware and software. An implementation of the method and system of the present invention can be realized in a centralized fashion in one computing system or in a distributed fashion where different elements are spread across several interconnected computing systems. Any kind of computing system, or other apparatus adapted for carrying out the methods described herein, is suited to perform the functions described herein.

A typical combination of hardware and software could be a specialized or general-purpose computer system having one or more processing elements and a computer program stored on a storage medium that, when loaded and executed, controls the computer system such that it carries out the methods described herein. The present invention can also be embedded in a computer program product, which comprises all the features enabling the implementation of the methods described herein, and which, when loaded in a computing system is able to carry out these methods. Storage medium refers to any volatile or non-volatile storage device.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. In addition, unless mention was made above to the contrary, it should be noted that all of the accompanying drawings are not to scale. Significantly, this invention can be embodied in other specific forms without departing from the spirit or essential attributes thereof, and accordingly, reference should be had to the following claims, rather than to the foregoing specification, as indicating the scope of the invention.

It will be appreciated by persons skilled in the art that the present invention is not limited to what has been particularly shown and described herein above. A variety of modifications and variations are possible in light of the above teachings without departing from the spirit or essential attributes thereof, and accordingly, reference should be had to the following claims, rather than to the foregoing specification, as indicating the scope of the of the invention.

What is claimed is:

1. A method for securing data in a network using a data splitter device, the data including a data message, the data message having a first bit length, the method comprising:
   generating a random number using the data splitter device;
   creating a hash value using the random number and the data message, the hash value having a bit length less than the first bit length;
   passing the hash value through a pseudo random number generator to create, using the data splitter device, a first pseudo random number based at least in part on the random number and the first bit length of the data message, the first pseudo random number having a bit length equal to the first bit length;
   mixing, using the data splitter device, the first pseudo random number with the data message to create an encrypted message;
   transforming, using the data splitter device, the encrypted message into a second pseudo random number;
   mixing, using the data splitter device, the second pseudo random number with the random number to produce a key;
   placing, using the data splitter device, the encrypted message side-by-side with the key to produce an output message;
   dispersing the output message to a plurality of fragments; and
   storing the plurality of fragments in a plurality of data storage devices.

2. The method of claim 1, wherein dispersing the output message comprises:
   dividing the output message into a plurality of data segments, the plurality of data segments having a total amount of data segments equal to k; and
   dispersing the plurality of data segments into a plurality of fragments, each fragment containing 1/k of the output message such that any k fragments of the plurality of fragments can be used to recreate the encrypted message in its entirety.

3. The method of claim 2, wherein the dispersing the plurality of data segments is performed using one of a polynomial evaluation and a vector construction.

4. The method of claim 2, wherein k is less than a total amount of the plurality of fragments.

5. The method of claim 2, wherein a threshold number of fragments are needed to decrypt any portion of the data message.

6. The method of claim 5, wherein none of the data message is decipherable from less than the threshold number of fragments and the entire data message is decipherable from at least the threshold number of fragments.

7. The method of claim 5, wherein the threshold number of fragments is equal to k.

8. The method of claim 1, wherein the at least one random number has a bit length less than or equal to the first length.

9. The method of claim 1, further comprising:
transporting at least a first portion of the plurality of fragments along a first communication path of the network; and
transporting at least a second portion of the plurality of fragments along a second communication path of the network.

10. The method of claim 1, wherein the plurality of data storage devices have different locations.

11. A method for securing data in a network using a data splitter device, the data including a data message, the method comprising:
generating, using the data splitter device, at least one random number, the at least one random number having a first bit length equal to a bit length of the data message;
creating a hash value using the random number and the data message, the hash value having a bit length less than the first bit length;
passing the hash value through a pseudo random number generator to create, using the data splitter device, a first pseudo random number based at least in part on the random number and the first bit length of the data message, the first pseudo random number having a bit length equal to the first bit length;
mixing, using the data splitter device, the first pseudo random number with the data message to create an encrypted message;
transforming, using the data splitter device, the encrypted message into a second pseudo random number;
mixing, using the data splitter device, the second pseudo random number with the random number to produce a key;
placing, using the data splitter device, the encrypted message side-by-side with the key to produce an output message;
dividing the output message to a plurality of data segments using the data splitter device, the plurality of data segments having a total amount of data segments equal to k, each data segment having a bit length equal to the first bit length of the generated at least one random number;
dispersing the plurality of data segments and the at least on random number into a plurality of fragments, each containing 1/k of the encrypted message such that any k fragments of the plurality of fragments can be used to recreate the encrypted message in its entirety; and
storing the plurality of data segments in a plurality of data storage devices.

12. The method of claim 11, wherein k is less than a total amount of the plurality of fragments.

13. A data security system for securing a data message, the data security system comprising:
a pseudo random number generator;
a data splitter device including:
a data encryptor configured to:
generate a random number;
create a hash value using the random number and the data message, the hash value having a bit length less than a first bit length of the data message;
pass the hashed value through the pseudo random number generated to create a first pseudo random number based at least in part on the random number and the first bit length of the data message, the first pseudo random number having a bit length equal to the first bit length;
mix the first pseudo random number with the data message to create an encrypted message;
transform the encrypted message into a second pseudo random number;
mix the second pseudo random number with the random number to produce a key; and
place the encrypted message side-by-side with the key to produce an output message; and
an information disperser communicatively coupled to the data encryptor, the information disperser operating to disperse the output message to a plurality of fragments; and
a plurality of data storage devices communicatively coupled to the information disperser, the plurality of data storage devices configured to store the plurality of fragments.

14. The data security system of claim 13, wherein the data security system further comprising a pseudo random number generator, the data encryptor transforms the random number by passing the random number through the pseudo random number generator.

15. The data security system of claim 13, wherein the information disperser disperses the output message by:
dividing the output message into a plurality of data segments, the plurality of data segments having a total amount of data segments equal to k; and
dispersing the plurality of data segments into a plurality of fragments, each fragment containing 1/k of the output message such that any k fragments of the plurality of fragments can be used to recreate the encrypted message in its entirety.

16. The data security system of claim 13, further comprising:
a first communication path communicatively coupled to the information disperser and a first portion of the plurality of storage devices, the first communication path transporting at least a first portion of the fragments to the first portion of the plurality of storage devices; and
a second communication path communicatively coupled to the information disperser and a second portion of the plurality of storage devices, the second communication path transporting at least a second portion of the fragments to the second portion of the plurality of storage devices.

* * * * *